March 25, 1969     L. R. ORMEROD     3,434,323

EXTRUSION OF COMPOSITE BODIES

Filed May 14, 1965

United States Patent Office 3,434,323
Patented Mar. 25, 1969

3,434,323
EXTRUSION OF COMPOSITE BODIES
Leslie Roy Ormerod, Didcot, England, assignor to United Kingdom Atomic Energy Authority, London, England
Filed May 14, 1965, Ser. No. 455,854
Claims priority, application Great Britain, May 25, 1964, 21,576/64
Int. Cl. B21c 23/22; B23p 17/04
U.S. Cl. 72—258                    4 Claims

ABSTRACT OF THE DISCLOSURE

A method of forming a nuclear fuel element by extrusion comprising the formation of a composite slug of the required materials in preparation for extrusion and the incorporation of a layer of a bond assisting material between adjacent components of said slug, said material having the property of shattering under extrusion deformation.

---

This invention relates to the extrusion of composite bodies and is particularly but not exclusively concerned with the production of nuclear reactor fuel elements.

One such form of fuel element comprises a tubular core of uranium aluminum alloy sheathed internally and externally with an aluminum cladding.

It has been previously suggested that composite fuel element tubes could be produced by co-extruding the uranium aluminum alloy with the cladding materials by first preparing a suitable extrusion slug assembly and then extruding the slug. The slug may comprise inner and outer aluminum sleeves with an uranium aluminum alloy sleeve accurately interposed between them. However, difficulties have arisen due to lack of metallurgical bonding between the uranium-aluminum alloy sleeve and cladding interfaces particularly at the ends of the uranium-aluminum alloy sleeve.

In particular the degree of bonding between the core alloy and the aluminum cladding is unsatisfactory since the bond must withstand subsequent heating to temperatures in the range of 600°–620° C. during testing and assembly. Unbonded areas tend to form blisters or pimples at such temperatures. Additionally, lack of bond between the core and cladding leads to variations in the extruded length of the core alloy due to the length of the "lead" and "trail" of the core i.e. the length of reduced thickness core alloy extending at each end of the core after extrusion.

The object of the present invention is to provide an improved method of extruding composite bodies in which the aforementioned difficulties are minimised.

According to the invention, a method of extruding a composite body comprises the formation of a composite slug of the required materials in preparation for extrusion and the incorporation of a layer of a bond assisting material between adjacent components of said slug, said material having the property of shattering under extrusion deformation.

According to a further feature of the invention, a method of extruding a composite body wherein one of the materials is aluminum comprises the formation of a composite slug of the required materials, the aluminum component of the slug being anodised on at least the portion of its surface adjacent another component.

Preferably the anodised surface is formed by the chromic acid process.

In a further aspect of the invention a method of extruding a nuclear fuel element comprises the formation of a composite slug in preparation for extrusion, said slug incorporating an outer aluminum sleeve, an inner aluminum sleeve and a sleeve of a nuclear fuel alloy interposed between said inner and outer sleeves, at least a portion of the surfaces of the inner and outer sleeves adjacent said fuel sleeve being anodised by the chromic acid process.

The inner and outer sleeve may be formed with shoulder portions such that when the sleeves are concentrically assembled an annular space is provided for the nuclear fuel and said shoulder portions are anodised. Preferably the shoulder portions are radiused and the nuclear fuel insert correspondingly shaped to contact intimately said radius.

In a preferred form the invention may be used to provide arcuate or flat fuel plates by assembling a composite slug in preparation for extrusion said slug comprising inner and outer sheathing sleeves having a composite sleeve interposed between them, said composite sleeve comprising circumferentially alternate portions of sheathing material and nuclear fuel material at least a portion of the surfaces of the inner and outer sleeves adjacent the fuel portions being anodised by the chromic acid process.

To enable the nature of the invention to be more readily understood an embodiment of the invention will now be described by way of example with reference to the accompanying drawing.

To produce a fuel element tube suitable for use in a reactor it is essential that a metallurgical bond is established at the interfaces of the aluminum cladding and the uranium-aluminum core during extrusion and the bond should be such that subsequent heating to 600° C.–620° C. does not cause breakdown. Conventional methods of ensuring a bond, which include the pre-assembly degreasing and wire brushing of the aluminum surfaces to remove or disturb the oxide film formed on the components by exposure to the atmosphere, have not proved satisfactory when the surfaces so treated are other than parallel to the direction of extrusion.

Since the shape of the end faces of the core tends to control the length of the "lead" and "trail" of the extruded core it is particularly necessary to ensure bonding of the core to the inner and outer sleeves at the ends of the core.

It has been found that a suitable bond is produced if the inner and outer sleeves are anodised, using the chromic acid process, at least on the portion of their surfaces adjacent the core.

The anodic layer approximately 0.005 inch thick is relatively brittle and tends to shatter as soon as extrusion deformation begins but provides, for a short period, substantially oxide free interfaces which bond together easily. The particles of oxide from the anodic layer penetrate into the interfaces and improve the metal flow characteristics during the extrusion.

While forms of anodising other than the chromic acid process can be used to provide the bond assisting layer in the aluminum components it has been found that the chromic acid process produces the more satisfactory results particularly when the fuel elements are required to withstand high temperatures (620° C.). For example the sulphuric acid process appears to produce good bonding at the interfaces but subsequent heating of the fuel tubes to about 500° C. produces isolated "pimples" at the ends of the uranium-aluminum core. The "pimples" are caused by the breakdown of the aluminum sulphate inherent in the anodic film produced by the sulphuric acid process.

Figure 2:
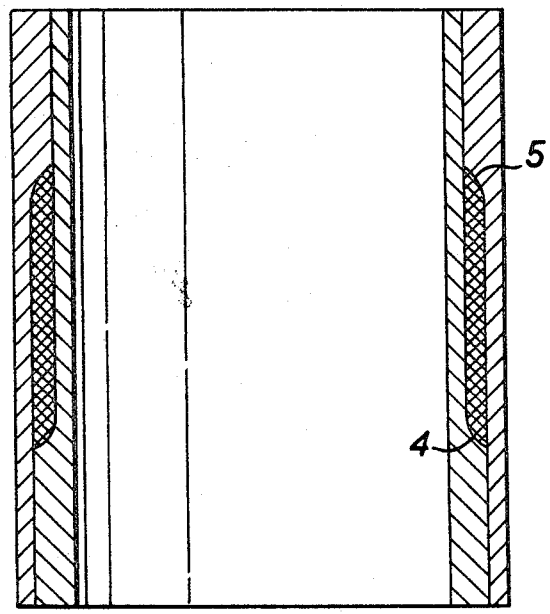
FIG. 2 is a mid-sectional view through an assembled slug.

Referring to the drawings, a slug prepared for extrusion of a nuclear fuel element tube comprises three anular sleeves. An outer aluminium sleeve 1, an inner aluminium sleeve 2 and a uranium aluminium alloy core 3 interposed between the inner and outer sleeve. The inner and outer sleeves are formed with radiused shoulder portions 4 and 5 respectively and when concentrically assembled (FIG. 2) the inner and outer sleeves provide an annular space which accurately located the core 3. The ends of the core are radiused to correspond intimately with the shoulders 4 and 5.

Using the conventional chromic acid process for 99.5% aluminium the inner and outer sleeves 1 and 2 are anodised before assembly around the areas of the radiused shoulders 4 and 5. The sleeves are degreased and positioned as the anode in a bath of 2.5% chromic acid aqua (free from $H_2SO_4$ and sulphates) at 40° C. The voltage is raised from zero to 40 volts during 10 minutes, held constant at 40 volts for 20 minutes, slowly raised to 50 volts over the next 5 minutes and held at 50 volts for a final 5 minutes giving a total treatment time of 40 minutes. The sleeevs are then washed and dried.

After assembly the slug is swaged, preferably in a direction opposed to the direction of extrusion, to remove any radial clearance between the components and the whole assembly is then dehydrated at 625° C. for two hours in preparation for the extrusion process.

The dehydration may be carried out in vacuum or in air circulating even in which case the slug is protected by an aluminium foil wrapper.

To reduce the difficulties attendant in anodising only part of the surface of the sleeve all of the inner surface of the outer sleeve and all of the outer surface of the inner sleeve can be anodised if desired. Alternatively the fuel containing core sleeve can be anodised but the uranium 235 content of the alloy tends to complicate the process and in practice it has proved simpler to anodise the other components.

It will be appreciated that the use of the term aluminium is used as including aluminium alloys and in particular the aluminium alloys used as cladding materials for nuclear reactor fuel elements.

Figure 1:
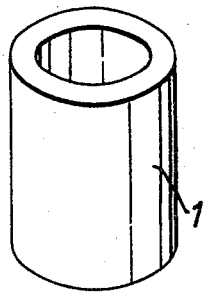
FIG. 1 is a perspective exploded view of a composite slug prepared for extrusion of a fuel element tube.
Figure 3:
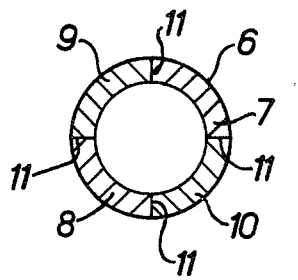
FIG. 3 is a sectional plan of a fuel sleeve suitable for the production of plate type elements.

The invention is not restricted to the production of annular fuel elements, for example, other shapes such as hexagonal or square section may be provided and plate type fuel elements be first formed as extruded tubes and the tubes subsequently split lengthwise and rolled flat. Preferably the fuel core in the extrusion slug would be divided into a plurality of discrete core pieces separated by strips of cladding material and the resultant tube would be split around the centre of said strips to provide fuel plates in which the core material would be completely enclosed. In one arrangement illustrated in FIG. 3 the fuel sleeve 6 is formed by four segments, two of uranium alloy fuel 7 and 8 and two of aluminium 9 and 10. The alloy fuel portions are separated by the aluminium portion.

I claim:
1. A method of forming a nuclear fuel element comprising forming a composite slug in preparation for extrusion said slug,
   (a) said slug incorporating an outer aluminum sleeve,
   (b) an inner aluminum sleeve and a
   (c) sleeve of a nuclear fuel alloy interposed between said inner and outer sleeves,
   (d) said inner sleeve having a radiused, outwardly projecting shoulder portion and
   (e) said outer sleeve having a radiused, inwardly projecting shoulder portion such that when the sleeves are concentrically assembled an annular space is provided for the nuclear fuel sleeve,
   (f) the ends of the nuclear fuel sleeve being shaped to contact intimately said radiused portions,
   (g) at least the shoulder portions on the said inner and outer sleeves being anodised,
   (h) swaging the composite slug to remove any radial clearance between the components, (i) heating said composite slug at 625° C. for at least two hours and
   (j) extruding the composite slug.

2. A method of forming a nuclear fuel element comprising the steps of assembling a composite slug in preparation for extrusion said slug including
   (a) an outer sheathing sleeve,
   (b) an inner sheathing sleeve and
   (c) a composite sleeve, formed by discrete portions of a nuclear fuel alloy separated circumferentially by portions of sheathing material, interposed between said inner and outer sleeves
   (d) said inner sleeve having a radiused, outwardly projecting shoulder portion and
   (e) said outer sleeve having a radiused, inwardly projecting shoulder portion such that when the sleeves are concentrically assembled an annular space is provided for the nuclear fuel sleeve,
   (f) the ends of the composite fuel sleeve being shaped to contact intimately said radiused portions and
   (g) at least the shoulder portions of the inner and outer sleeves adjacent the fuel portions in said composite sleeve being anodised by the chromic acid process,
   (h) swaging the assembly to remove any radial clearance between the components,
   (i) dehydrating and subsequently extruding the slug to form a tubular element, and
   (j) splitting the element lengthwise through the sheathing material circumferentially to separate the portions of nuclear fuel.

3. A method of forming a nuclear fuel element according to claim 2 and comprising the steps of
   (a) swaging the assembly in counter direction to the direction of extrusion to remove any radial clearance between the components
   (b) heating the assembly to 625° C. for at least two hours,
   (c) subsequently extruding the assembly to form a tubular element and
   (d) splitting the element lengthwise through the portions circumferentially separating the fuel portions to form arcuate plates.

4. A method of forming a nuclear fuel element according to claim 3 wherein the composite sleeve comprises alternate segments of nuclear fuel and a sheathing material.

References Cited
UNITED STATES PATENTS

| | | | |
|---|---|---|---|
| 3,004,907 | 10/1961 | Precht et al. | 176—82 |
| 3,098,022 | 7/1963 | Karnie | 264—.5 |
| 3,114,688 | 12/1963 | Wyatt et al. | 264—.5 |
| 3,124,875 | 3/1964 | Takahashi et al. | 264—.5 |
| 3,160,951 | 12/1964 | Markert et al. | 176—67 |

FOREIGN PATENTS
670,910  9/1963  Canada.

CHARLES W. LANHAM, *Primary Examiner.*

E. M. COMBS, *Assistant Examiner.*

U.S. Cl. X.R.

29—400; 176—67